United States Patent Office 3,101,371
Patented Aug. 20, 1963

3,101,371
2,3-BIS(p-METHOXYPHENYL)-N-DIALKYL-
AMINOALKYLPENTANAMIDES
Kurt J. Rorig, Glenview, Ill., assignor to G. D. Searle &
Co., Chicago, Ill., a corporation of Delaware
No Drawing. Filed Jan. 2, 1962, Ser. No. 163,893
4 Claims. (Cl. 260—559)

This invention relates to 2,3-bis(p-methoxyphenyl)-N-dialkylaminoalkylpentanamides and processes for the preparation thereof. More particularly, this invention relates to new and useful chemical compounds of the formula

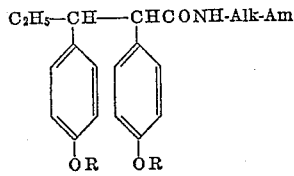

wherein R represents an alkyl radical, Alk represents an alkylene radical, and Am represents an optionally-alkylated amino radical.

Among the alkyl radicals represented by R, especially lower alkyl radicals are preferred, which is to say methyl, ethyl, propyl, isopropyl, butyl, isobutyl, sec-butyl, tert-butyl, pentyl, neopentyl, hexyl, isohexyl, heptyl, and like monovalent, saturated, acyclic, straight- or branched-chain, hydrocarbon groupings having the formula —$C_nH_{2n+1}$ wherein $n$ represents a positive integer less than 8.

Preferably of lower order also are the alkylene radicals represented by Alk, illustratively, ethylene, trimethylene, propylene, tetramethylene, 2-methyl-1,2-propylene, pentamethylene, 2,2-dimethyl-1,3-propylene, and homologous divalent, saturated, acyclic, straight- or branched-chain, hydrocarbon groupings having the formula —$C_nH_{2n}$— wherein $n$ is defined as before.

Am in the generic formula for compounds of this invention subsumes both the primary amino radical, —$NH_2$, and secondary and most advantageously tertiary amino radicals resulting from the substitution of one or two alkyl—especially, lower alkyl—radicals, respectively, for hydrogen therein. The alkyl groupings present when Am designates a tertiary amino radical may either be discrete, thus

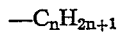

or they may be joined together directly or through oxygen or a second nitrogen atom to compose cyclic amino radicals optimally but not necessarily exclusively comprising at least 4 and as many as 8 carbon atoms as, for example, in pyrrolidino, methylpyrrolidino, dimethylpyrrolidino, trimethylpyrrolidino, piperidino, methylpiperidino, dimethylpiperidino, methylethylpiperidino, morpholino, piperazino, methylpiperazino, ethylpiperazino, and like monovalent, 5- and 6-membered, heterocyclic groupings. The terminal "ino" in the radical names set forth denotes attachment of the radicals thus characterized via nitrogen.

Equivalent to the foregoing basic amides for the purposes here described are non-toxic acid addition and quaternary ammonium salts thereof, the compositions of which may be symbolized by

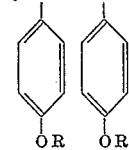

wherein R, Alk, and Am retain the meanings previously assigned; Q is selected from among hydrogen and lower alkyl, hydroxy(lower alkyl), and lower alkenyl radicals, as also such aralkyl radicals as benzyl, phenylethyl, and naphthylethyl; T represents one equivalent of an anion—for example, chloride, bromide, iodide, nitrate, phosphate, sulfate, sulfamate, methyl sulfate, ethyl sulfate, benzene-sulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage; and $x$ represents a positive integer less than 3.

The compounds to which this invention relates are useful because of their valuable pharmacological properties. Thus, for example, they are diuretics, as also antibiotics variously effective against bacteria such as *Diplococcus pneumoniae*, fungi such as *Trichophyton mentagrophytes*, algae such as *Chlorella vulgaris*, and cotyledenous seed germination. Further, they are anti-cholesterologenic agents adapted to inhibit exogenous hypercholesterolemia; and moreover they counteract the heat, swelling, and rubor characteristic of the inflammatory response to tissue insult.

Preparation of the instant compounds proceeds by heating an acid chloride of the formula

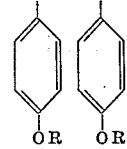

with an amine of the formula

Am—Alk—$NH_2$ in an inert solvent medium, such as butanone, with potassium carbonate or equivalent acid acceptor present if desired. (R, Alk, and Am retain the meanings previously assigned.)

Conversion of the basic amides of this invention to corresponding acid addition salts is accomplished by simple admixture thereof with 1 or 2 equivalents of any of various inorganic and strong organic acids, the anionic portion of which conforms to T as hereinbefore defined.

The quaternary compounds comprehended are those derived by contacting a claimed basic amide with an organic ester of the formula

QT

Q and T being limited by the meanings hereinabove assigned. Either 1 or 2 QT aggregates may be incorporated, quaternization taking place in the temperature range between 25 and 100 degrees centigrade in an inert solvent medium such as chloroform, acetone, butanone, methanol, butanol, or the like. Quaternization is ordinarily completed in from 1 to 48 hours and is generally carried out in a closed system if a lower alkyl halide—such as methyl chloride—is one of the reagents. Using methyl bromide, the preparation of quaternary salts may be smoothly effected in butanone solution at 70 degrees centigrade after a reaction period of approximately 1 hour.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *2,3 - bis(p - methoxyphenyl)pentanoyl chloride.*—A mixture of 31 parts of 2,3-bis(p-methoxyphenyl)pentanoic acid melting at approximately 183–184° (U.S. 2,745,870), 600 parts of anhydrous ether, 25 parts of thionyl chloride, and approximately 1 part of pyridine is heated at the boiling point under reflux with agitation for 2 hours, then freed of ether and excess thionyl chloride by vacuum distillation. The colorless crystalline residue is 2,3-bis(p-methoxyphenyl)pentanoyl chloride melting at approximately 130–131°.

B. *2,3 - bis(p-methoxyphenyl)-N-(2-dimethylaminoethyl)pentanamide.*—A mixture of 100 parts of 2,3-bis(p-methoxyphenyl)pentanoyl chloride (M.P. 130–131°), 30 parts of 2-dimethylaminoethylamine, 40 parts of finely-divided potassium carbonate, and 200 parts of dry butanone is heated at the boiling point under reflux for 24 hours, whereupon the insoluble solids precipitated in process are separated by filtration. The filtrate is stripped of solvent by vacuum distillation, and the residue, together with the solids previously separated, is suspended in 200 parts of aqueous 2.5% potassium carbonate. The resultant suspension is extracted with ether. The ether extract is dried over anhydrous potassium carbonate, treated with decolorizing charcoal, and filtered. The filtrate is stripped of solvent by distillation. The residual oil crystallizes to an ecru waxen solid which, recrystallized from cyclohexane, melts at 110–113°. The ivory-colored powder thus obtained is 2,3-bis(p-methoxyphenyl)-N-(2-dimethylaminoethyl)pentanamide, having the formula

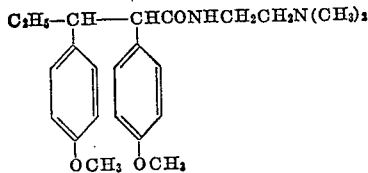

*Example 2*

*2,3 - bis(p-methoxyphenyl) - N - (2-diethylaminoethyl)pentanamide.*—Substitution of 36 parts of 2-diethylaminoethylamine for the 2-dimethylaminoethylamine called for in Example 1B and recrystallization of the reaction product from a mixture of benzene and hexane, rather than cyclohexane, affords, by a procedure otherwise identical with that detailed in Example 1B, 2,3-bis(p-methoxyphenyl)-N-(2-diethylaminoethyl)pentanamide melting at 91–93°. The product has the formula

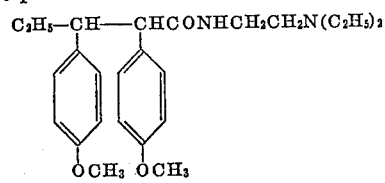

*Example 3*

*2,3 - bis(p-methoxyphenyl)-N-(3-diethylaminopropyl)-pentanamide.*—A mixture of 100 parts of 2,3-bis(p-methoxyphenyl)pentanoyl chloride (M.P. 130–131°), 39 parts of 3-diethylaminopropylamine, 40 parts of finely-divided potassium carbonate, and 200 parts of dry butanone is heated at the boiling point under reflux for 24 hours. Insoluble solids thrown down are then separated by filtration, and the filtrate is stripped of solvent by vacuum distillation. The residue is, together with the insoluble solids previously separated, extracted with 200 parts of aqueous 2.5% potassium carbonate. The carbonate suspension is extracted with ether. The ether extract is dried over anhydrous potassium carbonate, treated with decolorizing charcoal, filtered, and stripped of solvent by distillation. The residue is chromatographed on silica gel, using methanol and ethyl acetate as developing solvents. From an eluate comprising approximately 47% methanol in ethyl acetate, on distillation of solvent, there is obtained, as an ivory-colored solid residue, 2,3-bis(p-methoxyphenyl)-N-(3-diethylaminopropyl)pentanamide melting at 65.5–68.5°. The product has the formula

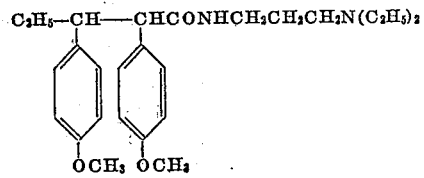

What is claimed is:
1. A compound of the formula

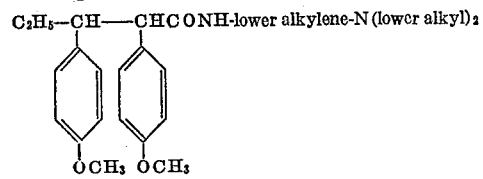

wherein the lower alkylene radical called for separates the groups attached thereto by more than 1 carbon atom.

2. 2,3 - bis(p-methoxyphenyl)-N-(2-dimethylaminoethyl)pentanamide.

3. 2,3 - bis(p-methoxyphenyl)-N-(2-diethylaminoethyl)pentanamide.

4. 2,3 - bis(p-methoxyphenyl)-N-(3-diethylaminopropyl)pentanamide.

No references cited.